H. J. KLINE.
INTERNAL COMBUSTION ENGINE.
APPLICATION FILED JUNE 11, 1917.
1,387,408.
Patented Aug. 9, 1921.
8 SHEETS—SHEET 1.
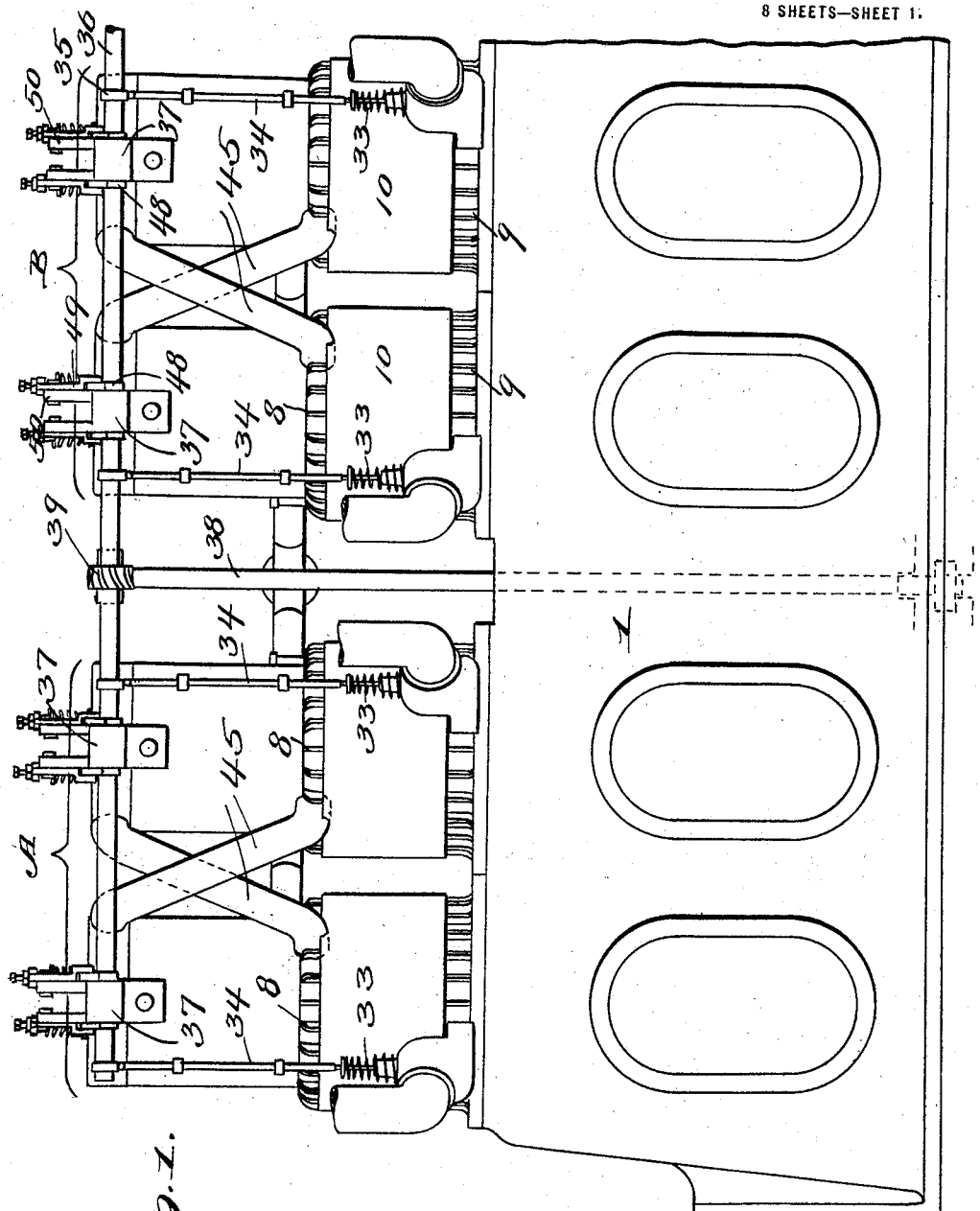

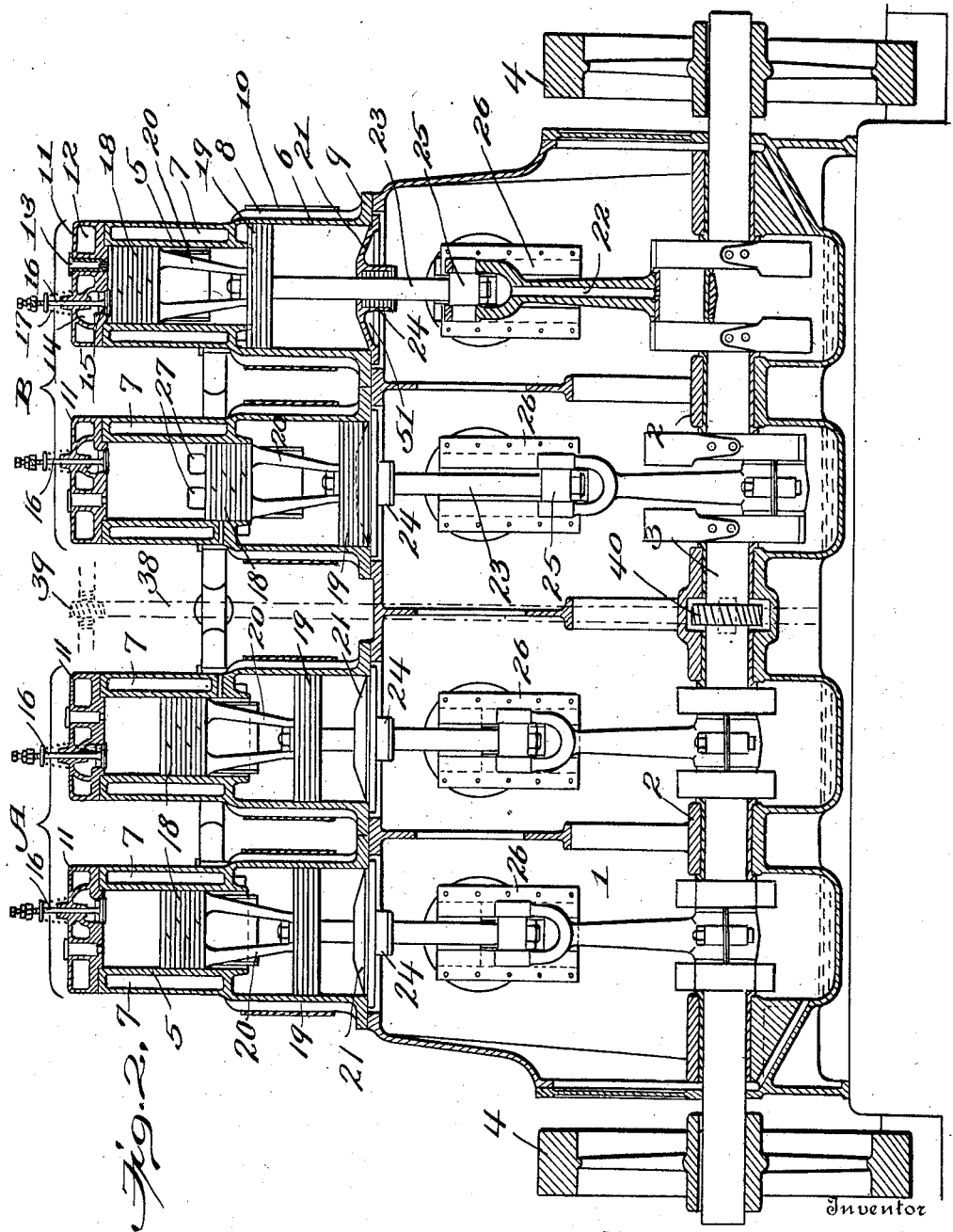

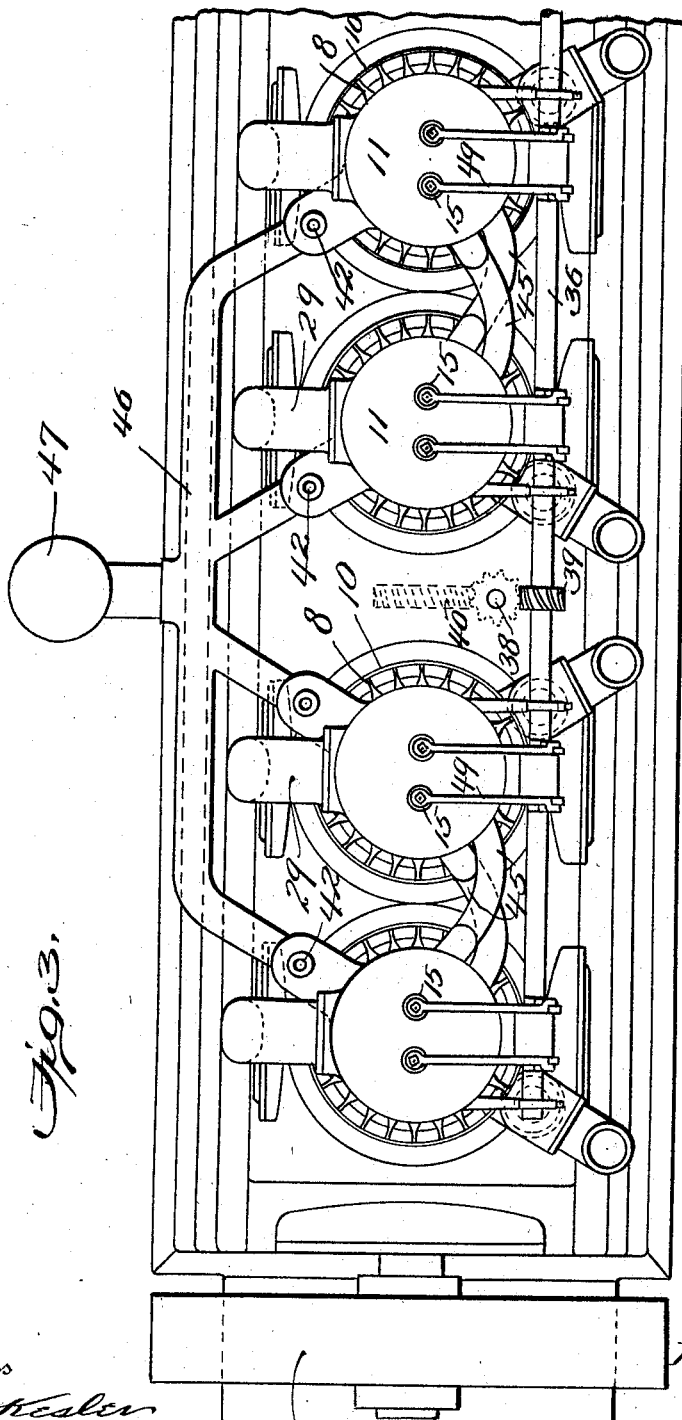

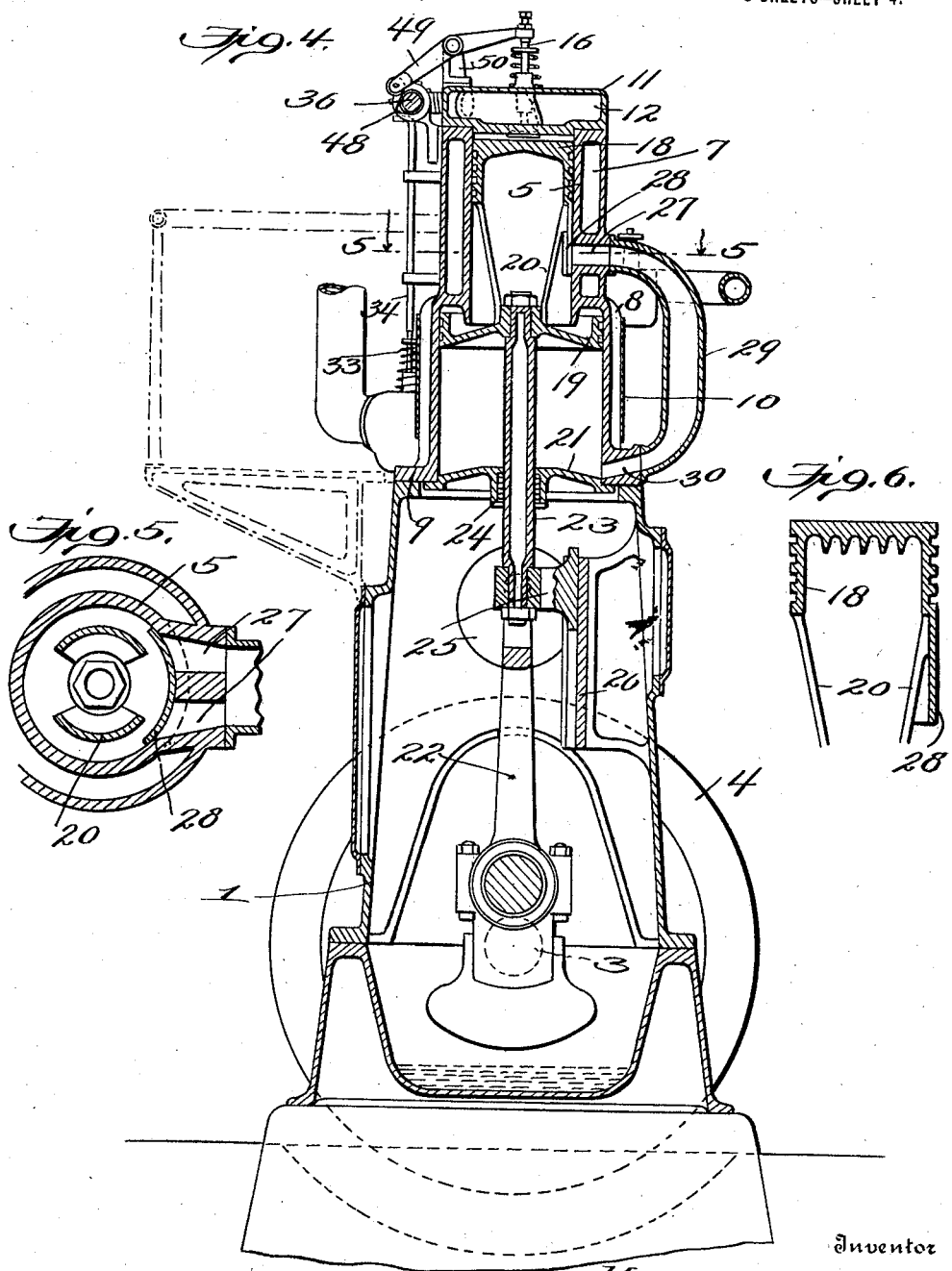

H. J. KLINE.
INTERNAL COMBUSTION ENGINE.
APPLICATION FILED JUNE 11, 1917.
1,387,408.
Patented Aug. 9, 1921.
8 SHEETS—SHEET 5.
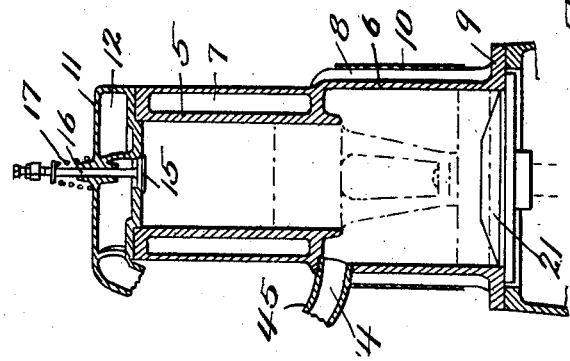
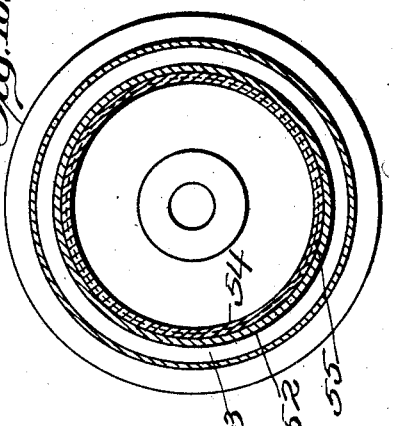
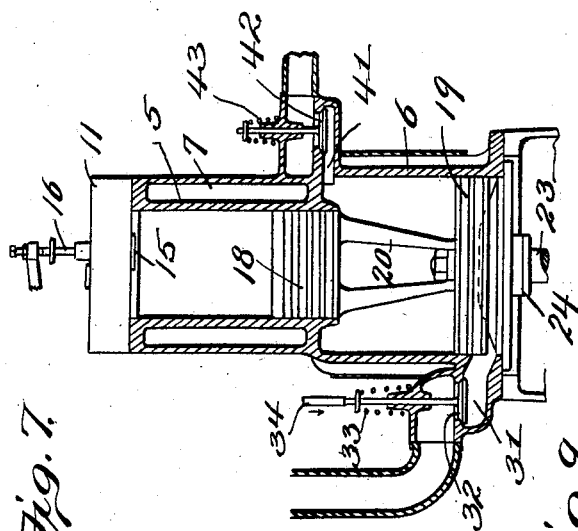
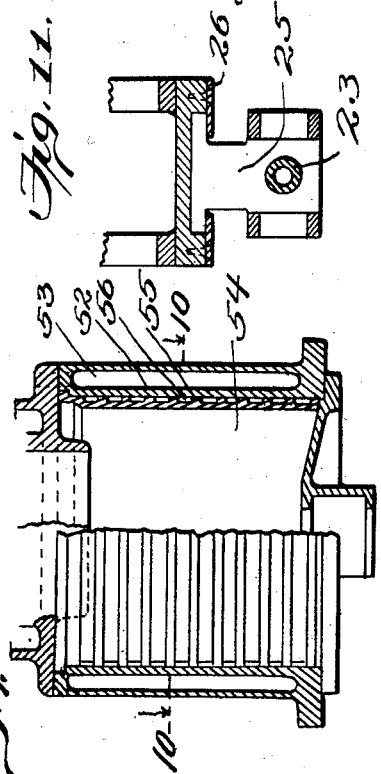
Inventor
Harmon J. Kline
Witness
By
Attorney H. J. KLINE.
INTERNAL COMBUSTION ENGINE.
APPLICATION FILED JUNE 11, 1917.
1,387,408.
Patented Aug. 9, 1921.
8 SHEETS—SHEET 6.
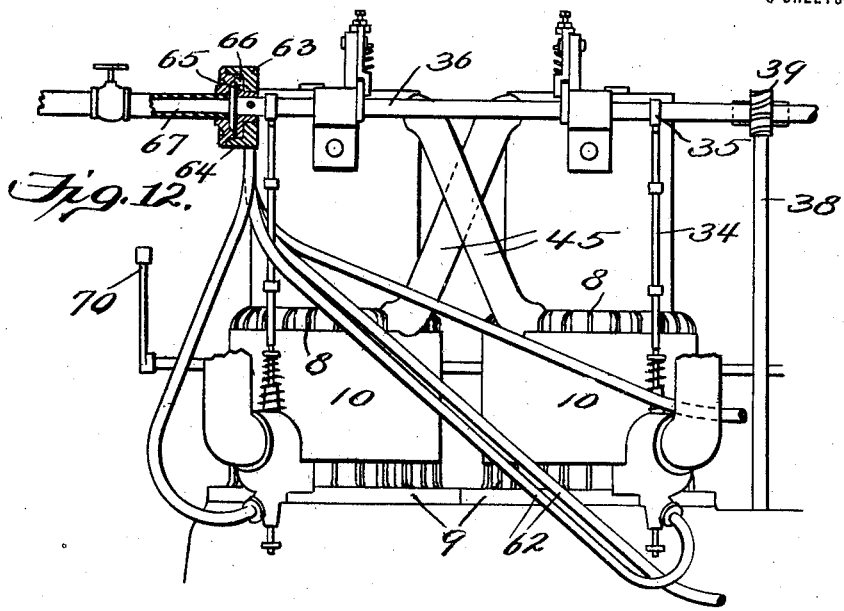
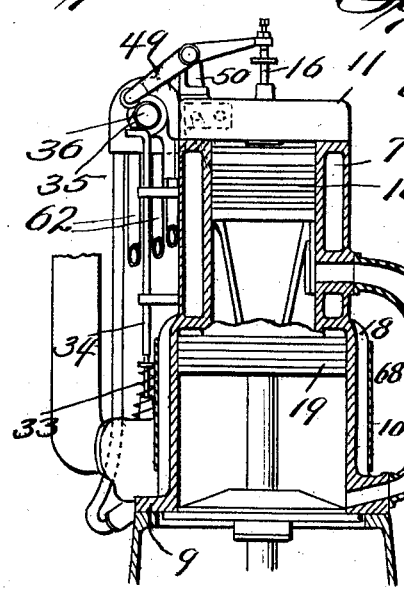
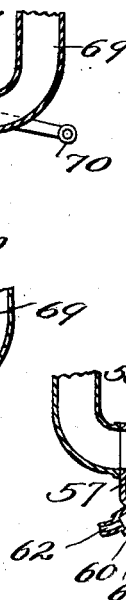
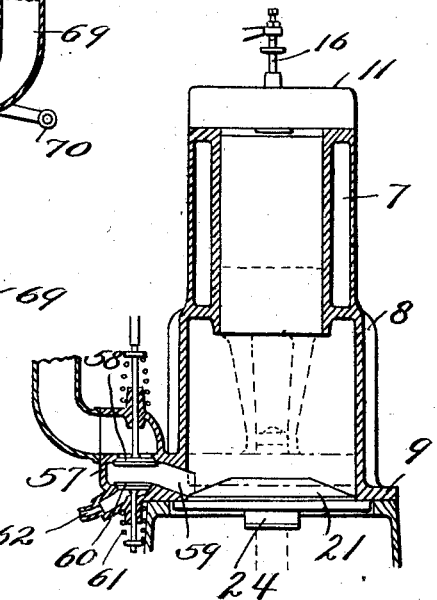
Witness
Inventor
Harmon J. Kline
By
Attorney

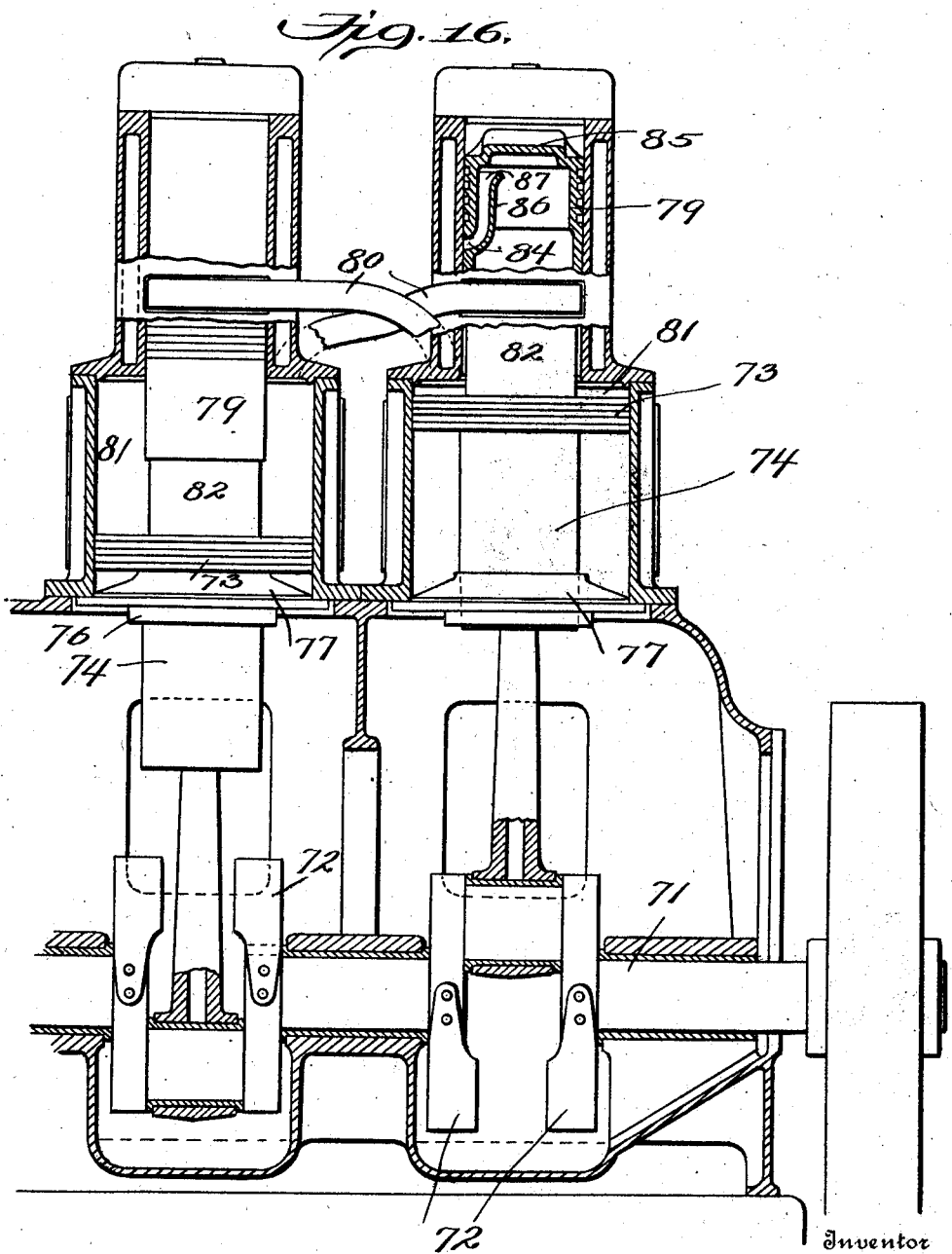

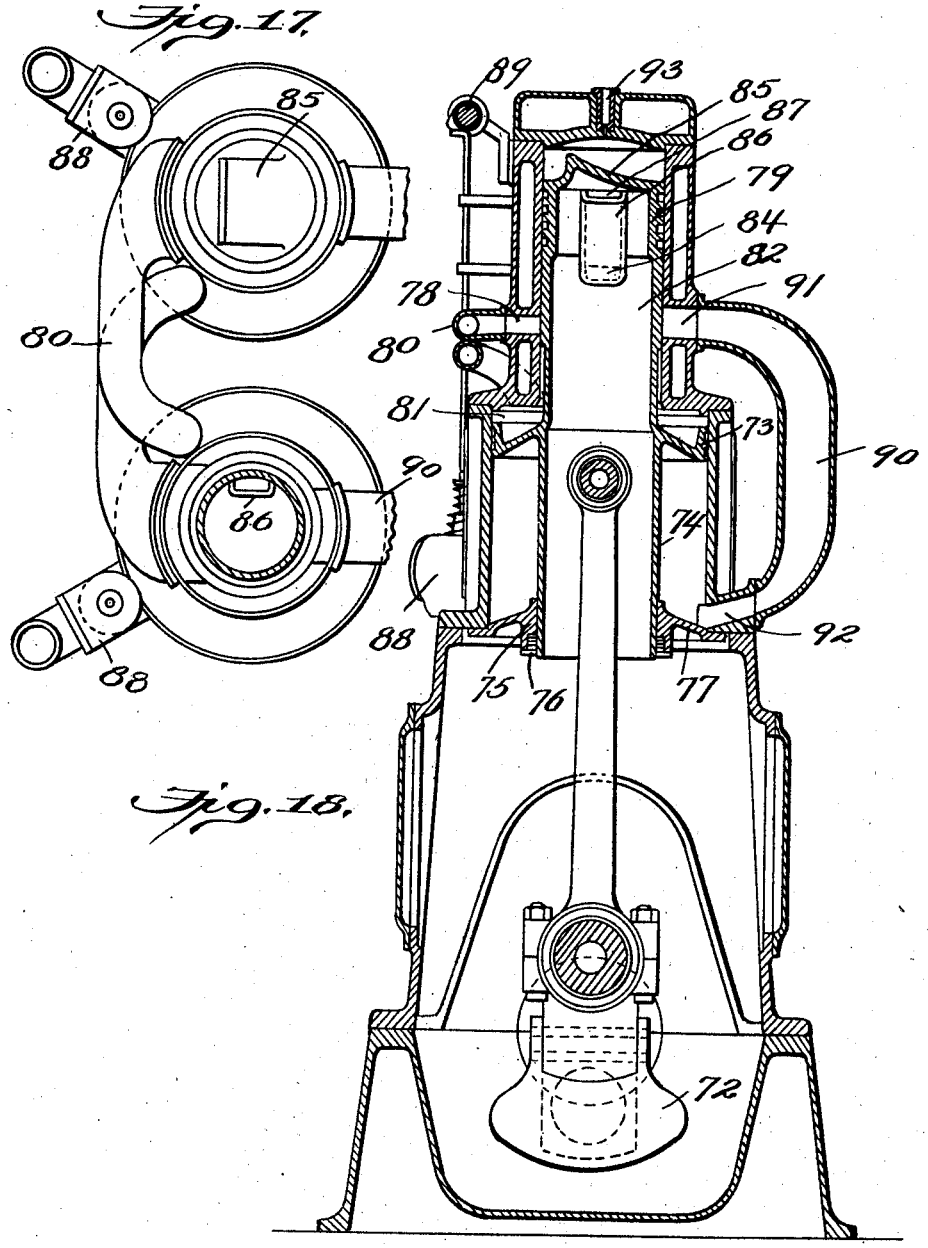

UNITED STATES PATENT OFFICE.

HARMON J. KLINE, OF LANSING, MICHIGAN.

INTERNAL-COMBUSTION ENGINE.

1,387,408.  Specification of Letters Patent.  Patented Aug. 9, 1921.

Application filed June 11, 1917. Serial No. 174,155.

*To all whom it may concern:*

Be it known that I, HARMON J. KLINE, a citizen of the United States, residing at Lansing, in the county of Ingham and State of Michigan, have invented new and useful Improvements in Internal-Combustion Engines, of which the following is a specification.

My present invention relates to improvements in internal combustion engines, and more especially to those of the compound type wherein the exploded gases after acting in one cylinder to operate the piston therein on its power stroke are caused to act in another cylinder to operate a relatively larger piston on its power stroke.

The primary objects of the invention are to provide an improved engine of this class whereby reduction in consumption of fuel is effected, greater power with an engine of given dimensions is obtained, and simplicity in construction is effected. According to the present invention, the high pressure, low pressure, and compressing cylinders are so related and connected that loss of heat during the transfer of the burning gases from the high pressure to the low pressure cylinder is reduced to a minimum and conserved, thereby increasing the efficiency of the engine as compared with engines of this class as heretofore proposed.

The invention furthermore provides improved means for cooling the low pressure cylinder to the proper degree and also the high pressure piston when such is necessary, and it also provides a simple and efficient starting device for the engine.

To these and other ends, the invention consists in certain improvements, and combinations and arrangements of parts, all as will be hereinafter more fully described, the novel features being pointed out particularly in the claims at the end of the specification.

In the accompanying drawings:—

Figure 1 is a side elevation of a compound internal combustion engine constructed in accordance with the present invention, the engine as shown embodying four pairs of high and low pressure cylinders.

Fig. 2 represents a central longitudinal section of the engine as shown in Fig. 1.

Fig. 3 is a top plan view of the engine as shown in Figs. 1 and 2.

Fig. 4 represents a transverse section of the engine taken through one of the pairs of high and low pressure cylinders and the intermediate compressing cylinder.

Fig. 5 is a detail sectional view on the line 5—5 of Fig. 4.

Fig. 6 is a detail sectional view of an air-cooled high pressure piston which may be used when desirable or necessary.

Fig. 7 represents a central vertical section through the high and low pressure cylinders in planes intersecting the intake port of the compressing cylinder and the exhaust port of the low pressure cylinder.

Fig. 8 is a view similar to Fig. 7, but taken in a plane intersecting the outlet port of the compressing cylinder and the intake port of the high pressure cylinder.

Fig. 9 is a detail sectional view showing a modified structure for cooling the low pressure cylinder.

Fig. 10 represents a section on the line 10—10 of Fig. 9.

Fig. 11 is a detail sectional view of one of the cross-heads and coöperating guide.

Fig. 12 shows one end of a compound engine embodying the present invention and equipped with an air starting device.

Fig. 13 represents a longitudinal section through the high and low pressure cylinders of the engine as shown in Fig. 12.

Fig. 14 represents a longitudinal section through the high and low pressure cylinders in the plane of the compressed air intake valve and the exhaust valve for the low pressure cylinder.

Fig. 15 is a detail view of the valve for interrupting communication between the high and low pressure cylinders when the starting device is in operation.

Fig. 16 is a central vertical section through one end of an engine of modified construction and embodying the present invention.

Fig. 17 is a top plan view of the structure shown in Fig. 16, one of the high pressure cylinders being shown in horizontal section.

Fig. 18 represents a transverse vertical section taken longitudinally through a pair of the high and low pressure cylinders as shown in Fig. 16.

Similar parts are designated by the same reference characters in the several views.

The present invention is applicable to compound internal combustion engines operating upon either the two or the four-cycle principle, although the engine as shown in the accompanying drawings is adapted to operate upon the two-cycle principle. It is also preferable, especially in engines of the larger sizes, to employ the Diesel or semi-Diesel principle of high compression and direct fuel injection, although in engines of the smaller sizes the fuel may be admitted through a carbureter and the air and fuel mixture compressed in the compressing cylinder preparatory to admission to the high pressure cylinder. The preferred embodiments of the invention are shown in the accompanying drawings and will be hereinafter described in detail, but it is to be understood that the invention is not limited to the precise construction and arrangement shown, as modifications and changes are contemplated and such will be included within the scope of the claims.

Preferably, and as shown, the engine comprises a suitable crank case or base 1 having suitable bearings 2 which support the crank shaft 3, the latter having one or more fly wheels 4 fixed thereon, as usual, and the high pressure, low pressure, and compressing cylinders are mounted on the crank case. According to the present invention, the high pressure, low pressure, and compressing cylinders are combined as a unit. Different numbers of these units may be used. As an example, the engine as shown in Figs. 1–3 inclusive comprises four units. The high pressure cylinder 5 of each unit is preferably mounted above the low pressure cylinder 6 of such unit, the low pressure cylinder being of greater area or diameter than the high pressure cylinder and, in the construction shown in Figs. 1–4 inclusive, and 7 and 8, the high pressure cylinder is provided with a water jacket 7 for cooling it, and the low pressure cylinder is provided with a number of longitudinally extending flanges or fins 8 which extend downwardly along the sides of the cylinders exteriorly thereof and merge into the flange 9 which secures the respective unit to the crank case. These fins present a relatively large aggregate air-cooling surface for the low pressure cylinder, and in order to insure circulation of air upwardly between the fins a jacket 10 is preferably fitted around the fins, bridging the spaces between them and forming vertical channels through which the air may flow upwardly, the lower edge of the jacket being spaced a suitable distance above the flange 9. The fins 8 also serve to provide reinforced connections to carry the strain of the high pressure cylinder to the attaching flange 9. The high pressure cylinder is provided with a head 11 which is preferably provided with a water jacket 12, as shown, and this head (in those cases where the engine operates upon the Diesel or semi-Diesel principle) is provided with a fuel injection passage 13 which may be connected in the usual way with a fuel injection pump. The head of the high pressure cylinder is also provided with an intake port 14 and with an inwardly opening valve 15, the stem 16 of this valve extending upwardly through a guide in the head and having a spring 17 which acts normally to seat the valve, although the forcing of air into this cylinder from its respective pumping cylinder will cause opening of the valve automatically. Obviously, this valve 15 may be actuated mechanically should such be found necessary. A high pressure piston 18 operates in the high pressure cylinder and a low pressure piston 19 of larger diameter operates in the low pressure cylinder, these two pistons being rigidly connected so as to operate in unison by a spider 20. The bottom of the low pressure cylinder is closed by a head 21 and, in the construction shown, the pistons of each unit are relieved of side pressure, due to angularity of the connecting rod 22, by providing each low pressure piston with a piston rod 23 which extends through a stuffing box 24 in the head 21 and connecting this rod with a cross-head 25, the cross-head being connected to the connecting rod and coöperating with a guide 26 which is fixed within the crank case. With the arrangement described, the space within the high pressure cylinder above the piston 18 receives the air and fuel, compresses the mixture, and sustains the initial explosion of the gas, the lower end of the low pressure cylinder below the piston 19 therein receives the exploded gases from the high pressure cylinder, confining these gases so that they will act to move the piston 19 upwardly, and the upper end of the cylinder 6 above the piston 19 constitutes a compression chamber wherein air or an explosive mixture, as the case may be, is compressed preliminarily to its introduction into the appropriate high pressure cylinder. The high pressure cylinder is provided with outlet ports 27 which are so located that they will be uncovered by the piston 18 when the latter approaches the limit of its power stroke, and the piston 18 in the high pressure cylinder is provided with a downwardly extending apron or extension 28 which is adapted to lap or cover the outlet ports 27 during the upper portion of the stroke of the piston 18. A transfer conduit 29 leads from the outlet ports 27 of the high pressure cylinder to an intake port 30 at the lower end of the low pressure cylinder 6, this conduit serving in effect as a receiver through which the exploded gases are transferred from the high pressure cylinder to the low pressure cylinder. This conduit or receiver may be covered with heat insulating material and it may also, if necessary, be lined with a heat insulating material in order to avoid undue loss of heat from the gases during their transfer between the high and low pressure cylinders. The low pressure cylinder is provided at its lower end with an exhaust port 31 and this exhaust port is controlled by an exhaust valve 32, this exhaust valve being normally held to its seat by a spring 33 and it is opened at appropriate intervals by a rod 34 which is actuated by a cam 35 of appropriate shape on the cam shaft 36. The cam shaft is preferably mounted in bearings 37 near the upper ends of the high pressure cylinders and it may be driven from the crank shaft 3 of the engine by a vertical shaft 38 through spiral gears 39 and 40. The cylinder 6 is provided at or near its upper end with an intake port 41, and this intake port is controlled by an inwardly opening valve 42, this valve being normally held upon its seat by a spring 43 and is unseated to admit fluid to the upper side of the piston 19 as soon as the pressure in the cylinder 6 is reduced by the downstroke of the piston 19, it closing and remaining closed during the upward stroke of the piston 19, whereby the charge of fluid introduced into the chamber above the piston 19 is compressed. An outlet port 44 also leads from the upper end of the cylinder 6 and from the compressing chamber above the piston 19. Owing to the fact that the piston 19 compresses a charge of air or a mixture of air and fuel, as the case may be, during the up-stroke of the piston 19, it is necessary to supply the air or mixture so compressed to another unit of the engine, the high pressure piston of which is at or near the limit of its out-stroke. To accomplish this result, the units of the engine are grouped in pairs, A representing one pair, and B representing another pair, and the cranks for the units of each pair are set in diametrically opposite relation so as to cause the pistons in the two units of each pair to move in reverse directions. It is preferable to set the cranks for one pair of units at a ninety degree angle to the cranks for the other pair of units, where a set of four units is employed, in order to equally distribute the explosions and impulses during each revolution of the crank shaft. With the units grouped in pairs as described, the outlet port 44 of the compressing chamber of one unit is connected by a pipe 45 to the intake port 14 for the high pressure cylinder of the other unit of the pair, the latter unit having the outlet port 44 of the compressing chamber connected by a similar pipe 45 to the intake port 14 of the high pressure cylinder of the other pair. With this arrangement it will be obvious that the high pressure piston of one unit is descending while a charge is being compressed by the low pressure piston of the other unit of the pair, and when the high pressure piston referred to reaches the limit of its working or power stroke, it uncovers the exhaust port 27 in the high pressure cylinder, permitting the exploded gases to pass through the receiver 29 into the low pressure cylinder beneath the piston 19 of the same unit, and the intake valve 15 of the high pressure cylinder referred to may then open to permit the air or explosive mixture from the upper side of the low pressure piston, which is at the upper limit of its stroke, to enter the high pressure cylinder. The same action is repeated in the next unit having its crank set at 180° while the crank shaft is making another half revolution. During the upward movement of the pistons of each unit the exploded gases contained in the low pressure cylinder beneath the piston 19 act to move such piston upwardly, and when the working stroke of this low pressure piston has been completed the gases are exhausted through the valve 32 which is opened at the appropriate time by the cam shaft 36.

In those cases where the engine operates upon the Diesel or semi-Diesel principle, the chamber above the piston 19 of each unit serves to compress air alone for subsequent introduction into the appropriate high pressure cylinder, the fuel being injected by a pump directly into the high pressure cylinder through the fuel valve 13. This principle is preferably used in engines of the larger sizes, but in engines of smaller sizes it may be preferable to supply the fuel from an ordinary carbureter. In such cases, the intake ports 41 of the several compressing chambers may be connected to an intake manifold 46, and this intake manifold may be connected to a suitable carbureter 47. Also, in some instances it may be preferable or necessary to operate the intake valves 15 of the high pressure cylinders mechanically instead of automatically. As shown in Figs. 1 and 3, the cam shaft 36 is provided with cams 48 which act upon rockers 49, the latter being pivoted to brackets 50 and arranged to operate upon the upper ends of the stems 16 of the intake valves 15.

Each conduit 29 is preferably of such a capacity relatively to the capacity of the high pressure cylinder that it will store a large volume of the exploded gases therein momentarily while the crank is passing the center, thereby delaying the full force of the pressure of this gas on the low pressure piston until such piston has started to rise. Ignition in the high pressure cylinder may be effected by a hot bulb or tube or, in the smaller sizes where a carbureter is employed, a spark plug may be used for ignition and the spark plug may be set in the fitting 13.

In order to prevent undue cooling of the hot gases in the low pressure cylinder, the head 21 closing the bottom thereof may be provided at its under side with heat insulating lagging.

Instead of air cooling the low pressure cylinder, as in the structure hereinbefore described, the low pressure cylinder may be provided with a jacket for the circulation of water or other cooling medium, and a suitable lining may be provided between this jacket and the interior of the cylinder to permit radiation of heat at a proper rate to maintain the low pressure cylinder at a suitable temperature, this temperature being preferably higher than would be the case if the cylinder were cooled directly by a cooling jacket. Such a construction is shown in Figs. 9 and 10. In this instance, the low pressure cylinder 52 is provided with a jacket 53 for the circulation of water or other cooling medium, and a lining 54 is fitted within the cylinder, this lining having ribs 55 with intervening spaces 56 whereby the ribs will bear against the inner wall of the cooling jacket while the intervening spaces will separate the lining from the wall of the jacket. With such a construction, a limited area of contact is provided between the wall of the cooling jacket and the lining whereby the interior of the cylinder may be maintained at a relatively high temperature to prevent undue cooling of the exploded gases, the intervening spaces between the lining and the wall of the cooling jacket limiting the conduction of heat between the lining and the jacket.

The present invention provides a simple and efficient starting device for an engine of the type herein described. This starting device is shown in Figs. 12–15 inclusive. Preferably, and as shown, the casing 57 which contains the exhaust valve 58 controlling the exhaust port 59 of the low pressure cylinder also contains an inwardly opening valve 60 which is normally held to its seat by a spring 61. A pipe 62 leads to the outer side of each valve 60, there being one of these pipes 62 for each low pressure cylinder. The pipes 62 lead from an air distributing valve 63 whereby compressed air at appropriate pressure is introduced in proper sequence into the low pressure cylinders to move the pistons therein upwardly. The compressed air distributing valve may be made in different ways, that shown in the present instance being similar to the air distributing valve disclosed in my prior Patent, No. 1,117,276, granted February 1, 1916. It comprises, generally, a casing 64 having a set of ports from which the pipes 62 lead, a rotating disk 65 having a port 66 therein to register successively with the ports in the casing, this rotating valve being fixed to the cam shaft 36, and a pipe 67 leads into the casing 64 and serves to supply compressed air thereto. A suitable valve may be provided in the pipe 67 to control the supply of compressed air to the engine. In employing a compressed air starting device for the engine, the conduit or receiver 29 which connects the high and low pressure cylinders of each unit is provided with a valve 68, and a vent 69 leading to the atmosphere is also provided. The valve 68 for each unit is provided with a lever or handle 70, and these levers or handles 70 of the several units may be connected together by a common operating rod. When it is desired to start the engine, the valves 68 of the several units are operated to bring them to the position shown in Fig. 15, the communication between the high and low pressure cylinders through the conduit or receiver 29 being then cut off and the high pressure cylinder being connected with the atmosphere. The valve in the compressed air supply pipe 67 is then opened to admit compressed air to the air distributing valve 63, and this compressed air will then flow in sequence through the pipes 62 and will enter the lower ends of the low pressure cylinders in succession as the pistons in such cylinders are about to ascend. The compressed air so admitted lifts the valves 60 from their seats, the exhaust valves remaining closed, and this compressed air acting on the under sides of the low pressure pistons causes the same to move upwardly, thereby rotating the crank shaft. While the engine is being rotated in this way, the fuel charges are admitted to the high pressure cylinders either from the compressing chambers (which will be the case when a carbureter is provided) or charges of compressed air will be admitted to the high pressure cylinders from the respective compressing chambers, and fuel may be injected into the high pressure cylinders as where the engine is operated upon the Diesel principle, and as soon as the engine begins to operate on its own power, the valves 68 of the different units are returned to the position shown in Fig. 13, communication between the high and low pressure cylinders being thereby reëstablished and the atmospheric vent 69 being then closed.

Another embodiment of the invention is shown in Figs. 16, 17 and 18. In this instance, the crank shaft 71 is provided with counterbalances 72 for the respective cranks, as in the preceding instances, and the crossheads and guides used on the preceding embodiments are omitted, the low pressure piston 73 in this instance having a cylindrical extension 74 extending downwardly therefrom and operating through a guide 75 and stuffing-box 76 formed in the lower head 77 of this cylinder. In this embodiment of the invention, the inlet valve is omitted from the head of the high pressure cylinder, and instead thereof a port 78 is formed in the wall of each high pressure cylinder at a point where it will be uncovered by the high pressure piston 79 as the latter approaches the limit of its outward or working stroke. The port 78 is connected by a pipe 80 to the compressing chamber 81 of the respective unit, the high pressure cylinders and their compressing chambers of adjacent units being cross-connected in this instance as in the previous instance. The high pressure piston 79 in this embodiment of the invention is also provided with a cylindrical extension 82 which is continued to the point where it joins with the low pressure piston 73, and the high pressure piston is formed in its side wall with a port 84 which is adapted to communicate with the compressing chamber 81 when the high and low pressure pistons approach the limit of their downward stroke. This port 84 serves to admit a small amount of air to scavenge the high pressure cylinder and oil mist from the crank case into the high pressure cylinder to lubricate the walls of the latter, and in order to cool the head 85 of the high pressure piston, a conduit 86 may be extended upwardly from the port 84 at the inner side of the high pressure piston and the conduit may have an inlet opening 87 immediately beneath the head 85 of the high pressure piston. In this arrangement, the main supply of air for the high pressure cylinder is received from the compressing chamber 81 as in the preceding instances. While the inlet ports of the high pressure cylinders, in this embodiment of the invention, are covered and uncovered by the movement of the pistons, the exhaust valve 88 for the low pressure cylinder may be of the type heretofore described and it may be operated from a cam shaft 89 similar to the cam shaft 36. A conduit or receiver 90 connects the exhaust port 91 of the high pressure cylinder with the inlet port 92 of the low pressure cylinder, as in the preceding embodiments, and the cycle of operations is the same as that described in the preceding instances. Also, the engine may operate upon the Diesel or semi-Diesel principle, in which case the fuel is injected directly into the high pressure cylinder through a fitting 93 or, if desired, the explosive mixture may be compressed in the compressing chamber 81 by attaching the inlet valves of these compressing chambers to a suitable carbureter.

The present invention provides a compound internal combustion engine wherein the heat energy of the fuel is utilized to the maximum, the exploded gases after operating a high pressure piston on its working stroke being brought to act upon a relatively larger low pressure piston, moving this piston in a reverse direction so that the engine is, in effect, a double-acting one. The loss of heat energy in the exploded gases during their transfer from the high pressure to the low pressure cylinder is reduced to a minimum, and the low pressure cylinder is so constructed that the gases therein, while acting on the low pressure piston, are maintained at a sufficiently high temperature to insure efficiency. Engines embodying the present invention are well adapted for electric lighting and power, pumping, marine propulsion, and for other power purposes.

By interposing the pumping or compressing chamber between the high pressure and low pressure cylinders, cooling of the high pressure and low pressure cylinders is facilitated by absorption of the heat by the compressing chamber or the fluid being compressed therein, the heat so absorbed being conserved and utilized in heating the charges or constituents of charges for the high pressure cylinders, thereby insuring efficiency in the compound feature of the engine.

By introducing the compressed air for starting purposes into the low pressure cylinder to act therein upon the relatively large low pressure piston, turning over of the engine is attained with a much lower air pressure than would be necessary if the compressed air were admitted to the high pressure cylinder. The engine is turned over against full compression in the high pressure cylinders so that their power may be utilized at once. This is essential for maneuvering with marine engines where quick action is necessary. Both starting air and fuel may be used at the same time, if necessary, and such will, of course, occur until the air is turned off.

I claim as my invention:—

1. In an internal combustion engine, the combination of a pair of units each comprising high pressure and low pressure cylinders, pistons reciprocable in said cylinders of each unit and operative in unison, the pistons of one unit moving in reverse direction to the movement of the pistons in the other unit of the pair, a pumping chamber located between said high pressure and low pressure cylinders of each unit and in communication with a face of one of the respective pistons, and a conduit connecting the pumping chamber of each unit to the inlet of the high pressure cylinder of the other unit of the pair.

2. In an internal combustion engine, the combination of a pair of units each comprising high pressure and low pressure cylinders arranged end to end, the high pressure cylinder having an inlet, pistons reciprocable in the cylinders of each unit and connected to operate in unison therein, the pistons in the different units moving in reverse directions, a pumping chamber arranged between the high pressure and low pressure cylinders of each unit and in communication with a face of the piston in the low pressure cylinder of the respective unit, a conduit connecting the high pressure cylinder of each unit to the low pressure cylinder of the same unit, and a conduit connecting the pumping chamber of each unit to said inlet of the high pressure cylinder of the other unit of the pair.

3. In an internal combustion engine, the combination of a pair of units each comprising high and low pressure cylinders arranged in axial alinement, the remote ends of said cylinders forming power chambers for the exploded gases, a receiver connecting the high pressure power chamber of each unit to the low pressure power chamber of the same unit, pistons connected to reciprocate in unison in the high and low pressure cylinders of each unit, the pistons of one unit being connected to move in reverse direction of the movement to the pistons of the other unit of the pair, a pumping chamber located between the high and low pressure cylinders of each unit and in communication with a face of the respective low pressure piston, and a conduit connecting the pumping chamber of each unit to the high pressure cylinder of the other unit of the pair.

4. In an internal combustion engine, the combination of a pair of units, each unit comprising high and low pressure cylinders, pistons connected to operate in unison therein, a pumping chamber being provided between said cylinders, and a receiver connecting the exhaust of the high pressure cylinder and the inlet of the low pressure cylinder of the same unit, a crank shaft connecting the pistons of the different units to cause reciprocation thereof in reverse directions, and cross connections between the pumping chambers and the inlets of the high pressure cylinders of the units.

5. In an internal combustion engine, the combination of a pair of units each comprising high pressure and low pressure cylinders placed end to end and having power chambers for the exploded gases in the remote ends thereof, pistons connected to reciprocate in unison in the cylinders of each unit, the pistons of one unit being connected to move in reverse direction to the movement of the pistons of the other unit, each high pressure cylinder having an exhaust port arranged to be uncovered by the piston in the respective cylinder when such piston approaches the end of its working stroke and to be covered by said piston during the remainder of its stroke, a receiver connecting the exhaust of each high pressure cylinder to the inlet of the low pressure cylinder of the same unit, a pumping chamber located between the high and low pressure cylinders of each unit, and a conduit connecting the discharge of each pumping chamber to the inlet of the high pressure cylinder of the other unit of the pair.

6. In an internal combustion engine, the combination of high pressure and low pressure cylinders, pistons connected to reciprocate in unison therein, and means for admitting starting fluid into the low pressure cylinder to move said pistons in a direction to effect compression in the high pressure cylinder.

7. In an internal combustion engine, the combination of high pressure and low pressure cylinders placed end to end, the remote ends of said cylinders being closed to form power chambers for the exploded gases, pistons connected to reciprocate in unison in said cylinders, a receiver connecting the exhaust of the high pressure cylinder to the inlet of the low pressure cylinder, and means for admitting starting fluid into the power chamber of the low pressure cylinder to move said pistons in a direction to effect compression in the high pressure cylinder.

8. In an internal combustion engine, the combination of high pressure and low pressure power cylinders placed end to end and having power chambers for the exploded gases at their remote ends, pistons connected to reciprocate in unison in the respective cylinders, a receiver connecting the exhaust of the high pressure cylinder to the inlet of the low pressure cylinder, and means for introducing compressed air into the remote end of the low pressure cylinder to act on the piston therein for starting and to effect compression in the remote end of the high pressure cylinder.

9. In an internal combustion engine, the combination of high pressure and low pressure power cylinders connected end to end and having power chambers for the exploded gases in their remote ends, pistons connected to reciprocate in unison in the respective cylinders, a receiver connecting the exhaust of the high pressure cylinder to the inlet of the low pressure cylinder, a valve in said receiver for cutting off communication between the high pressure and low pressure cylinders, and means for admitting compressed air into the remote end of said low pressure cylinder for starting and to directly move said pistons to effect compression in the remote end of the high pressure cylinder.

10. In an internal combustion engine, the combination of high pressure and low pressure cylinders, pistons connected to reciprocate in unison therein, a receiver connecting the exhaust of the high pressure cylinder to the inlet of the low pressure cylinder, and means for interrupting communication between the high pressure and low pressure cylinders through said receiver and for establishing communication between the combustion chamber of the high pressure cylinder and the atmosphere, and means for admitting compressed fluid to the low pressure cylinder for starting.

11. In an internal combustion engine of the compound type having a high pressure explosion cylinder provided with means for cooling it and a low pressure explosion cylinder connected to receive the products of combustion from the high pressure cylinder after utilization of such products therein, means for cooling the low pressure cylinder to a degree less than that to which the high pressure cylinder is cooled comprising air-cooled projections extending outwardly from the exterior wall of the low pressure cylinder, and a jacket extending around said projections and forming air entrance and exit passages for the spaces between the projections.

In testimony whereof I have hereunto set my hand in presence of two subscribing witnesses.

HARMON J. KLINE.

Witnesses:
CLARE N. WINSTON,
ERNEST R. A. HUNT.